(12) United States Patent
Aljarro et al.

(10) Patent No.: US 12,359,562 B2
(45) Date of Patent: *Jul. 15, 2025

(54) TRACEABLE AND DISINTEGRABLE ARTIFICIAL INTELLIGENCE POWERED SENSING SYSTEM AND METHOD FOR THE DETECTION OF DEFECTS IN PIPELINES

(71) Applicant: Saudi Arabian Oil Company, Dhahran (SA)

(72) Inventors: Ahmed Aljarro, Thuwal (SA); Nada Ibrahim Alruwaii, Thuwal (SA); Mohmmed T. Abdulmohsin, Dhahran (SA); Abdulaziz M. Almosa, Dhahran (SA); Khalid Ghamdi, Dhahran (SA); Salah A. Zahrani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,327

(22) Filed: Aug. 14, 2023

(65) Prior Publication Data
US 2025/0059884 A1    Feb. 20, 2025

(51) Int. Cl.
E21B 47/13    (2012.01)
(52) U.S. Cl.
CPC .................................... *E21B 47/13* (2020.05)
(58) Field of Classification Search
CPC ....................................................... E21B 47/13
See application file for complete search history.

(56) References Cited

U.S. PATENT DOCUMENTS 5,769,164 A * 6/1998 Archer ................ E21B 41/0078
166/222
6,768,959 B2    7/2004 Ignagni
(Continued)

FOREIGN PATENT DOCUMENTS

GB        2226633        7/1990
KR     20220105076       7/2022
(Continued)

OTHER PUBLICATIONS

Aghdam et al., "Localizing Pipe Inspection Robot Using Visual Odometry," 2014 IEEE International Conference on Control System, Computing and Engineering (ICCSCE 2014), Nov. 28-30, 2014, 6 pages.
(Continued)

*Primary Examiner* — Amine Benlagsir
(74) *Attorney, Agent, or Firm* — Fish & Richardson P.C.

(57) ABSTRACT

An apparatus includes a buoyant housing; a sensor arrangement housed within the buoyant housing, the sensor arrangement including an electromagnetic (EM) transmitter and several EM receivers; a wireless communications system to communicate a location of the apparatus within a pipe or other body having a material that is metallic, non-metallic, composite or a combination thereof, to an aerial or terrestrial tracking device; a processor to determining an induced signal value for each of the plurality of EM receivers; receiving the induced signal value for each of the plurality of EM receivers as an input to a neural network (NN); creating a visual representation of a body based on a NN comparison of the induced signal values for each of the EM receivers; and determining whether a body defect exists based on a comparison of the induced signal values for each of the EM receivers performed by the NN.

18 Claims, 10 Drawing Sheets

(56) References Cited

U.S. PATENT DOCUMENTS

| | | | |
|---|---|---|---|
| 7,841,249 B2 | 11/2010 | Tormoen | |
| 8,689,653 B2 | 4/2014 | Cogen et al. | |
| 8,973,444 B2 | 3/2015 | Hill et al. | |
| 10,132,823 B2 | 11/2018 | Giunta et al. | |
| 10,851,947 B2 | 12/2020 | Gong et al. | |
| 10,931,871 B2 | 2/2021 | Li et al. | |
| 11,519,546 B2 | 12/2022 | Louise-Alexandrine Baron et al. | |
| 2004/0173116 A1 | 9/2004 | Ghorbel et al. | |
| 2007/0062274 A1* | 3/2007 | Chikenji | E21B 47/01 73/152.55 |
| 2009/0090518 A1* | 4/2009 | Coon | E21B 27/005 166/236 |
| 2009/0128141 A1* | 5/2009 | Hopmann | E21B 47/092 324/207.24 |
| 2011/0199228 A1* | 8/2011 | Roddy | E21B 33/13 340/856.4 |
| 2014/0345878 A1* | 11/2014 | Murphree | E21B 34/14 166/377 |
| 2016/0362937 A1* | 12/2016 | Dyer | E21B 44/00 |
| 2017/0226849 A1* | 8/2017 | Fan | E21B 47/09 |
| 2018/0094519 A1* | 4/2018 | Stephens | E21B 47/007 |
| 2019/0339230 A1* | 11/2019 | Khalaj Amineh | G01V 3/28 |
| 2019/0346333 A1 | 11/2019 | Youcef-Toumi et al. | |
| 2020/0400419 A1 | 12/2020 | Li et al. | |
| 2021/0174486 A1* | 6/2021 | Chowhan | G06F 18/25 |
| 2022/0268392 A1 | 8/2022 | Moreau et al. | |
| 2023/0054659 A1 | 2/2023 | Danilov et al. | |

FOREIGN PATENT DOCUMENTS

| | | |
|---|---|---|
| RU | 2697008 | 8/2019 |
| RU | 2722636 | 6/2020 |
| WO | WO 2017153896 | 9/2017 |

OTHER PUBLICATIONS

Al-Masri et al., "Inertial Navigation System of Pipeline Inspection Gauge," IEEE Transactions on Control Systems Technology, Nov. 18, 2018, 28(2):609-616, 8 pages.

Buzi et al., "Sensor Ball: An Autonomous Untethered Logging Platform," Presented at the Offshore Technology Conference, Houston, Texas, May 4, 2020, 10 pages.

Ékes et al., "Pipe Penetrating Radar Inspection of Large Diameter Underground Pipes," Proceedings of the 15th International Conference on Ground Penetrating Radar, 2014, 4 pages.

Gomez et al., "An Ultrasonic Profiling Method for Sewer Inspection," IEEE International Conference on Robotics and Automation, Apr. 2004, 5:4858-4863, 6 pages.

International Search Report and Written Opinion in International Appln. No. PCT/US2024/018613, mailed on May 3, 2024, 13 pages.

Kazeminasab et al., "Localization, Mapping, Navigation, and Inspection Methods in In-Pipe Robots: A Review," IEEE Access, Nov. 23, 2021, 9:162035-58, 24 pages.

Liu et al., "The Use of Laser Range Finder on a Robotic Platform for Pipe Inspection," Mechanical Systems and Signal Processing, Aug. 2012, 31:246-257, 12 pages.

Murtra et al., "IMU and Cable Encoder Data Fusion for In-Pipe Mobile Robot Localization," Presented at the IEEE Conference on Technologies for Practical Robot Applications (TePRA), Woburn, Massachusetts, Apr. 22-23, 2013, 6 pages.

Nassiraei et al., "A New Approach to the Sewer Pipe Inspection: Fully Autonomous Mobile Robot "Kantaro"," IECON 2006—32nd Annual Conference on IEEE Industrial Electronics, Nov. 6-10, 2006, 4088-4093, 6 pages.

Ooi et al., "EM-Based 2D Corrosion Azimuthal Imaging using Physics Informed Machine Learning PIML," Prepared for presentation at the SPE Offshore Europe Conference & Exhibition, Sep. 7-10, 2021, 15 pages.

Santana et al., "Estimation of Trajectories of Pipeline PIGs Using Inertial Measurements and Non Linear Sensor Fusion," Presented at the 9th Annual IEEE/IAS International Conference on Industry Applications (INDUSCON), Sao Paulo, Brazil, Nov. 8-10, 2010, 6 pages.

Strapdown Inertial Navigation Technology, 2nd Edition, 2004, Chapter 3, 41 pages.

ucarecdn.com [online], "Specifications and requirements for in-line inspection of pipelines," Nov. 3, 2016, retrieved on Mar. 6, 2024, URL <https://ucarecdn.com/58371ddd-72ea-4cf4-9422-4c9fbfd5cac1/01_2016_Version.pdf>, 57 pages.

U.S. Appl. No. 18/449,295, Aljarro et al., Smart Body for Contactless Detection of Defects Using Artificial Intelligence, filed Aug. 14, 2023, 45 pages.

U.S. Appl. No. 18/185,068, Al-Sharif et al., In-pipe Localization of Pipeline Inspection Gadgets, filed Mar. 6, 2023, 31 pages.

U.S. Appl. No. 18/502,869, Al-Sharif et al., In-Pipe Localization of Tools Using Signal Profiles, filed Nov. 6, 2023, 36 pages.

U.S. Appl. No. 18/502,904, Al-Sharif et al., In-pipe Localization of Tools Using Time Between Signals, filed Nov. 6, 2023, 44 pages.

Wang et al., "Navigation of a Mobile Robot in a Dynamic Environment Using a Point Cloud Map," Artificial Life and Robotics, Jul. 26, 2020, 26:10-20, 11 pages.

Wu et al., "A Practical Minimalism Approach to In-pipe Robot Localization," 2019 American Control Conference (ACC), Jul. 10-12, 2019, 8 pages.

Wu, "Low-Cost Soft Sensors and Robots for Leak Detection in Operating Water Pipes," Thesis for the degree of Doctor of Philosophy in Mechanical Engineering, Massachusetts Institute of Technology, Department of Mechanical Engineering, Jun. 2018, 247 pages.

* cited by examiner

TRACEABLE AND DISINTEGRABLE ARTIFICIAL INTELLIGENCE POWERED SENSING SYSTEM AND METHOD FOR THE DETECTION OF DEFECTS IN PIPELINES

TECHNICAL FIELD

This disclosure generally relates to the examination and maintenance of oil and gas pipelines.

BACKGROUND

Oil and gas pipelines generally include metal structures that are subject to a wall-loss condition, often characterized as a degradation in structural integrity as a result of corrosion on the inner surfaces, outer surfaces, internally between the surfaces, or full surface to surface. For defects related to corrosion in metallic pipelines, the typical causes are contaminants that interact with the metallic material.

SUMMARY

The present disclosure describes techniques that can be used to detect defects in pipelines, including defects that form on the interior surface, outer surface, or interstitial surfaces of an above ground or buried pipeline. This disclosure also describes a data processing and analytics platform using artificial intelligence for the characterization of the integrity and long-term health of inspected assets. The smart body of the present disclosure can be deployed, and sensor information and/or sensor analysis information can be received using wireless communications. The smart body can include on-board processing hardware and software for analyzing and storing the sensor information. The smart body also includes wireless communications equipment for communicating information with entities outside of the pipeline, including, but not limited to, crawlers, drones, communications stations, etc. By using on-board processing and communications systems, the smart body can be deployed and can provide pipeline body defect analysis without having to be recovered (so called Deploy & Forget).

Aspects of the embodiments are directed to an apparatus comprising a buoyant housing that is buoyant in a production fluid, the buoyant housing comprising a disintegrable material; a sensor arrangement housed within the buoyant housing, the sensor arrangement comprising an electromagnetic (EM) transmitter surrounded by a plurality of EM receivers, the EM transmitter to transmit an alternating EM radiation signal through the buoyant housing, and the plurality of EM receivers to receive EM radiation through the buoyant housing, the received EM radiation to induce a signal (e.g., an electrical signal) in at least one of the plurality of EM receivers; a wireless communications system to communicate a location of the apparatus within a pipeline to an aerial or terrestrial tracking device; a hardware processor; and a non-transitory computer-readable storage medium coupled to the hardware processor and storing programming instructions for execution by the hardware processor, the programming instructions instructing the hardware processor to perform operations. The operations can be performed during operation of the apparatus in a pipeline that has production fluid, the pipeline having a body made of one or a combination of metallic, non-metallic, or composite material, the operations can include determining an induced signal value for each of the plurality of EM receivers; receiving the induced signal value for each of the plurality of EM receivers as an input for a neural network tangibly embodied on the non-transitory computer-readable storage medium; creating a visual representation of a body based on a neural network comparison of the induced signal values for each of the plurality of EM receivers; determining whether a body defect exists on the body of the pipeline based on a comparison of the induced signal values for each of the plurality of EM receivers performed by the neural network; and sending one or both of sensor information and sensor analysis information to another entity using the wireless communications system.

In some embodiments, the buoyant housing comprises an electromagnetically transparent material or a material with low magnetic permeability ($\mu<1$).

Some embodiments include a battery to supply power to the EM transmitter and the hardware processor, wherein the battery comprises a kinetic energy charger.

In some embodiments, the neural network is configured to process induced signal value information to output a visual representation of the body.

In some embodiments, the neural network implements a physics-driven machine learning algorithm to create the visual representation of the body.

In some embodiments, the visual representation of the body produced by the AI algorithm represents a formation of the body at a point or area along the body.

In some embodiments, the visual representation of the body produced by the AI algorithm represents a cross section of the body.

In some embodiments, a presence of a defect on the body is determined by the neural network based on an indication of metal loss from the induced signal of at least one receiver, the metal loss identified by a comparison of body at different locations of the body.

In some embodiments, each of the plurality of EM receivers comprise a sensor coil or winding that received EM radiation to induce a signal.

In some embodiments, the sensor arrangement is a first sensor arrangement and wherein the EM transmitter is a first EM transmitter and the plurality of EM receivers are a first plurality of EM receivers, the apparatus including a second sensor arrangement residing within the buoyant housing, the second sensor arrangement comprising a second EM transmitter surrounded by a second plurality of EM receivers.

In some embodiments, the buoyant housing comprises a substantially cylindrical form factor and houses a plurality of sensor arrangements, each sensor arrangement comprising an EM transmitter and a plurality of EM receivers.

Aspects of the embodiments are directed to a non-transitory computer-readable storage medium coupled to one or more hardware processors and storing programming instructions for execution by the one or more hardware processors, the programming instructions instructing the one or more hardware processors to perform operations. The operations performed during operation of the apparatus in a pipeline that has production fluid, the pipeline having a body made of one or a combination of metallic, non-metallic, or composite material, the operations can include determining an induced signal value for each of the plurality of EM receivers; receiving the induced signal value for each of the plurality of EM receivers as an input for a neural network tangibly embodied on the non-transitory computer-readable storage medium; creating a visual representation of a body based on a neural network comparison of the induced signal values for each of the plurality of EM receivers; and determining whether a body defect exists on the body based on a comparison of the induced signal values for each of the plurality of EM receivers performed by the neural network.

The sensor information and/or the results for sensor analysis can be communicated to another entity using a wireless communication system on-board of the smart body.

In some embodiments, the neural network is configured to process induced signal value information to output a visual representation of the body.

In some embodiments, the neural network implements a physics-driven machine learning algorithm to create the visual representation of the body.

In some embodiments, the visual representation of the body produced by the AI algorithm represents a thickness of the body at a point or area along the body.

In some embodiments, the visual representation of the body produced by the AI algorithm represents a cross section of the body.

In some embodiments, a presence of a defect on the body is determined by the neural network based on an indication of metal loss from the induced signal of at least one receiver, the metal loss identified by a comparison of body at different locations of the body.

In some embodiments, each of the plurality of EM receivers comprise a sensor coil or winding that received EM radiation to induce a signal.

Aspects of the embodiments are directed to a method performed by a smart body that includes, in a pipe carrying production fluid, the pipe having a body made of one or a combination of metallic, non-metallic, or composite material transmitting a first electromagnetic (EM) signal from an EM transmitter encased within the smart body towards a surface of the pipe; receiving, by an EM receiver encased within the smart body adjacent to the EM transmitter, a second EM signal reflected by the body of the pipe, the second EM signal being a reflected version of the first EM signal; receiving, by an EM receiver encased within the smart body adjacent to the EM transmitter, a third EM signal reflected by the body of the pipe, the third EM signal being a reflected version of the first EM signal; inducing a first induced signal within the EM receiver from the second EM signal; inducing a second induced signal within the EM receiver from the third EM signal; determining a first value of the first induced signal and determining a second value of the second induced signal; inputting the first value and the second value into a physics-driven machine learning algorithm; determining the presence of a defect in the body based on a comparison of the first value and the second value by the machine learning algorithm; and wirelessly transmitting the determination and/or the sensor information to another entity using a wireless communications system on-board of the smart body.

Some embodiments include determining a location of the smart body within the pipe based on one or more of a determination, based on a comparison of image data taken at a first moment in time and image data taken at a second moment in time, that the portion of the pipe imaged by the smart body is the same; or a determination, based on a wireless communications signal strength, captured at different locations along the pipe.

Some embodiments include determining that the smart body has not moved for a predetermined amount of time; and initiating a disintegration process within the smart body to disintegrate the smart body. For example, initiating the disintegration process can include retrieving any stored information on a memory in the body, erasing memory and clearing other secure information, and/or associating any body identifiers as lost.

The described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. The smart body can traverse the interior of pipelines to detect defects formed by corrosion or other ways without contacting the bodies of the pipeline. In addition, the smart body is deployable to inspect pipelines while the asset is online, minimizing shutdown times.

The untethered floating smart body described herein can also provide sensor information and results from analysis in near real-time, even for un-pig-able pipelines. The devices and methods described herein also can mitigate reliance on or supplement field data or direct data acquisition from the field using data produced from physics-based simulators that mimic field conditions. The techniques described herein analyze real-world data acquired by EM sensors within the smart body for defect detection, which increases accuracy and reliability of the defect analysis beyond using data obtained from simulations. The near real-time defect detection is achieved by first extracting the recorded data after retrieving the sensing device from the inspected asset (pipe), and then the processing of this data via AI. Once the data is retrieved, the AI processing unit can process it in real-time. The real-time defect detection is here achieved by the ability to trace and read the recorded data from the sensing device while it is still in operation inside a pipeline, and process the collected data externally (via an s level AI processing unit) or directly on-board (via a reduced version of the AI algorithm and microcontrollers-such as tinyML). All of this can be achieved in real-time via AI, including but not limited to AI that makes use of a physics-driven machine learning algorithm.

The smart body provides modularity and scalability of the AI-EM sensing and detection capability. The smart body can be configured for various defect detection scenarios. The smart body can also be configured to characterize structures of different material compositions.

Other advantages will be readily apparent from the various embodiments described below.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

BRIEF DESCRIPTION OF THE DRAWINGS

Like reference numbers and designations in the various drawings indicate like elements.

DETAILED DESCRIPTION

Figure 1A:
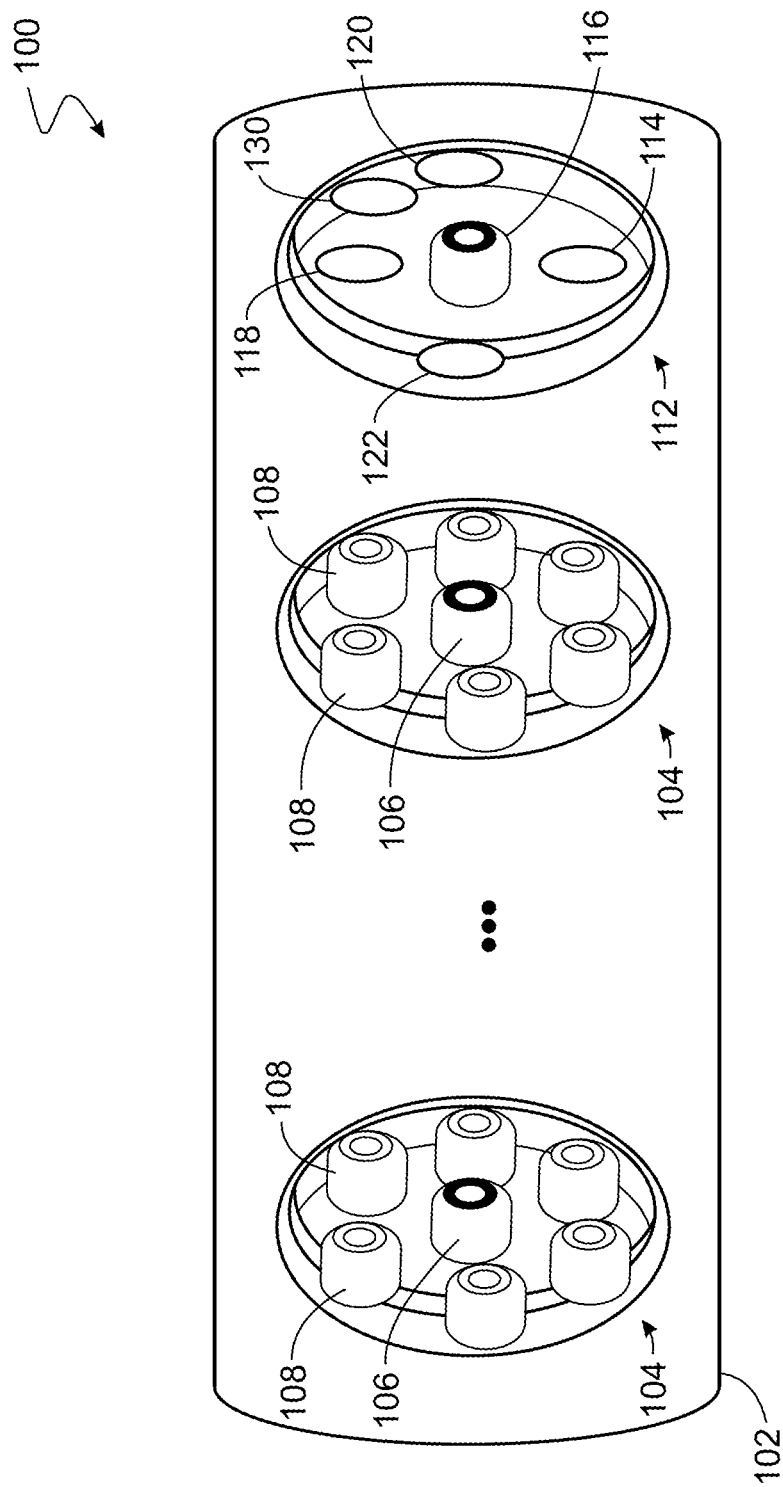
FIGS. 1A-1B are schematic diagrams of example systems that incorporate artificial intelligence (AI)-powered analytics and electromagnetics (EM)-based sensors according to an implementation of the present disclosure.

The present disclosure describes techniques that can be used to detect defects in pipelines, including defects that form on the interior surface, outer surface, or interstitial surfaces of an above ground or buried pipeline. This disclosure also describes a data processing and analytics platform using artificial intelligence for the characterization of the integrity and long-term health of inspected assets. The smart body of the present disclosure can be deployed, and sensor information and/or sensor analysis information can be received using wireless communications. The smart body can include on-board processing hardware and software for analyzing and storing the sensor information. The smart body also includes wireless communications equipment for communicating information with entities outside of the pipeline, including, but not limited to, crawlers, drones, communications stations, etc. By using on-board processing and communications systems, the smart body can be deployed and can provide pipeline body defect analysis without having to be recovered (so called Deploy & Forget).

Wall-loss is a condition in which a structure, such as metal pipelines, suffers degradation in structural integrity as a result of corrosion on the inner surfaces, outer surfaces, or interstitially. As oil and gas (O & G) pipelines are often buried underground and not straightforward to inspect, such defects cannot be easily tested, or observed by the naked eye, due to access limitations in exposing the entire structure and/or high associated excavation costs. Importantly, inner and internal defects are harder to detect since they occur away from the immediate outer surface of the pipeline and therefore they are visually not obvious. For defects related to corrosion in metallic pipelines, the typical causes are contaminants that interact with the metallic material. While corrosion usually begins locally, after a certain threshold it can progress at high rates, especially if there are repetitive cycles of contaminants in the flowing medium, which significantly increases failure risks. On one hand, the detection of defects in PIG-able pipelines relies on through-deploying inline inspection (ILI) tools. Nevertheless, these tools can suffer from relatively low detection rates and high operational costs, imposing potentially serious risks and challenges to production and business sustainability in O & G fields. In addition, the final reporting time on the outcome from these inspections can take up to ninety days, or longer, due to the heavy and manual requirements for analyzing the associated inspection records. On the other hand, for the detection of defects in un-PIG-able pipelines, this is much more challenging since special inlet and outlet will have to be setup in place before an inspection can take place. Nevertheless, in several scenarios, while such access procedures can be accommodated for, often times there is a restriction on touching or scrapping the inner surface of such pipelines for if they are scrapped this can lead to damage, therefore accelerating the rate of corrosion related failures, for example, in water carrying pipelines.

In the situation where defects associated with corrosions are left undetected, and consequentially unaddressed, the consequences of the resulting failures can lead to unfavorable scenarios, both financially and environmentally. Financially, these consequences includes un-desired shutdowns of a process (production line) and/or an entire facility, or a serious incident that can impact human safety. Environmentally, the consequences include damage to nearby land and water sources, and can have ecological consequences. Since these defect mechanisms are not easy to identify or straightforward to reveal, associated damages can remain unnoticed until random excavations are employed and an advanced ultrasound testing (UT) techniques are used to ascertain the condition of the pipeline. These excavation and testing practices can be very prohibitive for they are very time consuming and are considered costly processes. Similarly, the accuracy of the UT techniques can be insufficient due to the large number of variables (e.g., geometrical, environmental, orientational, accessibility, material-related, etc.), which can lead to high number of false positives (incorrect detection of corrosion) and/or false negatives (incorrect non-detection of defects) in the detection process. Additionally, many facilities make use of networks of pipelines that are buried, positioned deep underground, or constructed under building sites and cross-ways. As such, they are either very difficult to dig for or impossible to reach.

Due to the aforementioned challenges, it is often the case that operators rely on tools and practices for assessing the healthiness of pipelines. The reliability of such tools is not necessarily highly effective since the tools do not tend to reflect accurately enough the nature and status of inspected assets. There is a systematic technical gap in the assessment of pipelines for defects and wall-loss and what is desired by operational needs in the fields. Accordingly, there is a pressing need for improved detection and risk assessment tools to determine levels of degradation and damages, whereby to aid instituting timely and reliable maintenance scheduling. In addition, to help reduce the burdensome of a continuously faced high-risk challenges and associated costs: financially, environmentally and reliability.

It is in regard to these, and other considerations, that this disclosure is presented to detect conditions of compromised pipelines in real-time or near-real-time, which is realized via integrating detection and analysis systems and methods into a floatable smart body design, including the use of artificial intelligence (AI) techniques.

Figure 1B:
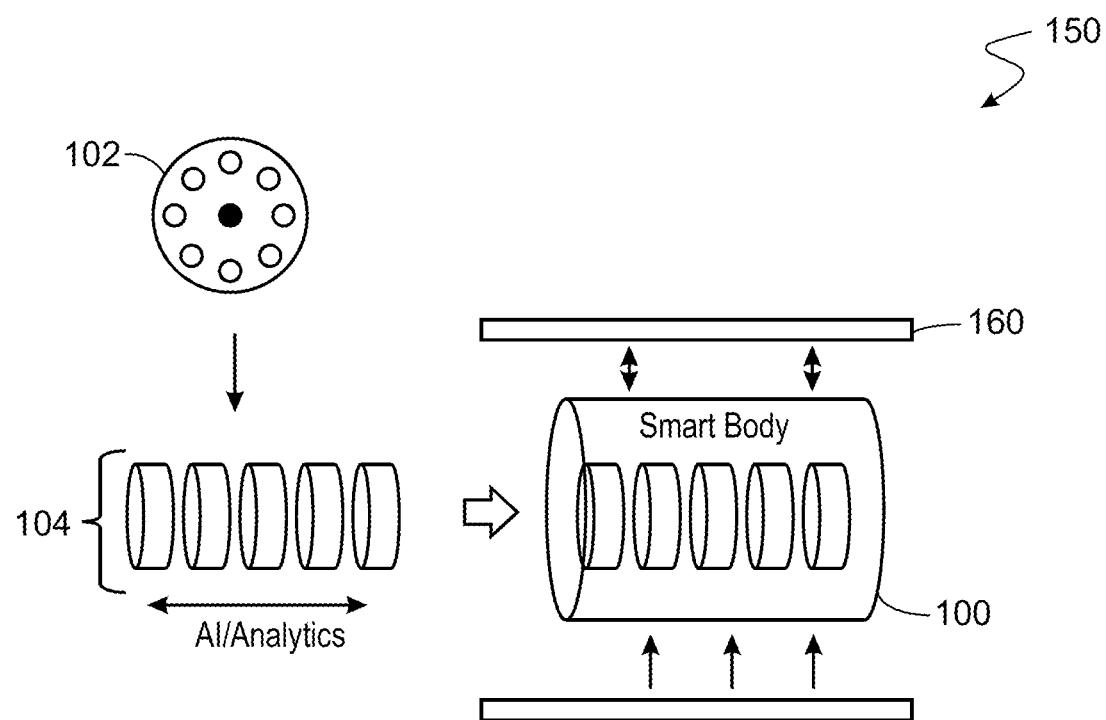

Referring to FIGS. 1A and 1B, various implementations incorporate AI-powered analytics and EM-based sensors in a floatable smart body. The implementations are designed for the detection of wall-loss metallic pipelines that may be inaccessible to a PIG system, using AI and electromagnetic (EM)-based sensing, with the objective of reaching detection rates higher than currently achieved with existing practices, and at significantly lower operational costs.

Embodiments of the present disclosure provide an advanced technology for the detection of defects in metallic pipelines, using contact-less AI and EM (AI-EM) based sensing embedded in floating bodies, with reporting capability in near real-time response. The AI-EM can make use of physics-driven machine learning algorithms and models. FIG. 1A illustrates an example design of the device described in this disclosure, referred to herein as a Smart Body, where the target design on the body is not limited to a cylindrical shape. Specifically, FIG. 1A is a schematic diagram of an example smart body 100 that includes a set of sensor capsules in accordance with embodiments of the present disclosure. FIG. 1B is a schematic diagram 150 of an example smart body 100 and constituent components according to some implementations.

In embodiments, the smart body 100 can be retrieved or recovered from the pipe; and data stored within the smart body 100 can be retrieved and analyzed to visualize and inspect the pipe for defects. In embodiments, the smart body 100 can include on-board processing hardware and software that can perform analysis of sensor information; the results of on-board sensor information can be extracted upon retrieval of the smart body 100. In embodiments, the smart body 100 can include on-board hardware and software for processing sensor information in real-time, and can also include communications information for communicating the sensor data and/or the results of sensor analysis to external processors, such as surface crawlers, aerial vehicles, surface stations, pipeline relay stations, etc. Aspects of the smart body 100 can include one or more of the aforementioned embodiments.

Smart body 100 includes a floatable body 102 and capsules 104 and 112 positioned within the floatable body 102. As illustrated, capsules 104 include a combination of an electromagnetic (EM) transmitter 106 positioned proximate a central axis of the capsule and a set of EM receivers 108a, 108b, etc. positioned around the EM transmitter 106 proximate the perimeter of the capsule. These capsules equipped with EM transmitters and/or receivers are designed to be secured within the floatable body. Notably, three capsules 102 are shown but more than three capsules can be included in the floating body floatable body 102.

In one illustration, the transmitter, responsible for emitting the initial electromagnetic signal for inspection of the target pipeline, is configured to operate at a frequency selected to interact with the material composition of the target pipeline with sufficient interaction to inspect the integrity of the wall. In some cases, the material composition includes carbon steel, for example API 5L X60. The receivers, responsible for collecting the transmitted signal after its interaction with the wall of the target pipeline, are configured to couple to this transmitted signal interacting with the wall in a manner that decouples and distinguishes a defected segment of the pipe from those that are not. In return, the physical sizes and dimensions of the transmitters and receivers are also optimized not only to respond to the presence of a defect in the wall of the pipe, but to also distinguish the defects of varying sizes.

The smart body 100 can also include within floatable body 102 a processing arrangement 112.

In some implementations, capsules 104 and 112 can be mounted at the front end or the back end of a the floatable body 102. For example, capsules 104 and 112 can be coaxially amount with respect to the floatable body 102. As illustrated, the transmitter 106 can be mounted towards the center of the capsule 104. The transmitter 106 emits EM signals in the form of, for example, pulsed waveforms, or almost continuous wave (CW). For example, when operating at a given frequency, the EM signals can be emitted with a specified repetition rate, and each emission involves a burst of a corresponding time in duration. These parameters are designed and modified in relation to the target material, which can be metallic, non-metallic, composite, or a combination thereof. The transmitter 106 can be configured as a coiled antenna, a dipole antenna, or a combination thereof. The radiation pattern of the transmitter can be omni-directional in the circumferential aspect so that the cross-section of the pipe that is co-planar with the capsule receives relatively uniform EM radiation. Additionally or alternatively, the transmitter 106 can more preferentially radiate a portion of the cross-section than other portions of the cross-section, and/or all circumferential aspects of the cross-section. In the focused arrangement, the transmitter 106 can be rotated about the axis of the capsule 104 to radiate all circumferential aspects of the cross-section.

The receivers 108 may be positioned on the circumference of the capsule 104 to be in close proximity to, but without contacting, the inner surface of the pipe (e.g., pipe 160 shown in FIG. 1B). In some cases, the receivers 108 may be evenly distributed around the circumference of the capsule 104. The receivers 108 may be stationary and spaced at equal distance from the transmitter 106. The receivers 108 may be tuned to encompass a larger bandwidth than the transmitter 106. The receivers 108 are configured to receive EM signals in response to radiated EM signal from the transmitter 106 in the surrounding of the inner wall of the pipe for the assessment of the integrity of the wall, where losses in the inner and outer surfaces as well as full wall-losses, can significantly affect the reception. Indeed, the implementations can assess situations varying from inner and outer surface losses (e.g., erosion) to full wall-losses (e.g., total loss).

To ensure uniformity, the transmitters and receivers are positioned within the smart body 100 such that the normal distances between the inner surface of the floatable body 102 and the receivers 108 are equivalent. The setup is axially aligned with the floatable body 102 and deployed for testing. In some embodiments, the sensor arrangements 104, 110, and others can be individual sensor "pucks." Sensor pucks can be small housings that contain an EM transmitter and a plurality of EM receivers. The sensor pucks can be contained within floatable body 102 and can be modular. The sensor pucks can be constructed so that each EM transmitter emits an EM signal with its own frequency, and the EM receivers can correspond to the EM transmitter to receive within a frequency band. This way, multiple independent frequencies can be used to characterize the body of the pipe using a single smart body. A similar design can be used without sensor pucks by integrating multiple structures of EM transmitter coils and EM receiver coils within the smart body. Coils can have air-cores or ferrite-cores.

During measurements, the EM transmitter (e.g., EM transmitter 106) emits an alternating electromagnetic signal with a specific frequency through a compensation circuit 120. (Compensating circuit 120 is shown with capsule 112, but can be located elsewhere without deviating from the scope of this disclosure.) With tuning circuits, such as tuning circuit 122, signals induced on the receiver coils are detected. (Tuning circuit 122 is shown to reside with circuit arrangement 112, but can be located elsewhere without deviating from the scope of this disclosure.) The recorded signals are then processed by a processor 114 and used as input to a machine learning algorithm stored in memory 116.

Capsule 112 can include other types of circuit elements. For example, capsule 112 can include a processor 114. Processor 114 can perform control functionality to control EM emission power from various transmitter 106. Processor 114 can also receive raw EM signals from receivers 108. In embodiments, processor 114 can also perform AI analytics processing on received EM signals. Information and instructions can be stored in memory 116. Capsule 112 can also include a power source 118. Power source 118 can provide power for various components, including processor 114 and the EM transmitters 106 and EM receivers 108.

In some embodiments, the circuit arrangement 112 also includes a wireless transceiver 130. Wireless transceiver 130 can send and receive information wirelessly. For example, wireless transceiver 130 can send raw and processed data to a receiver at the surface or elsewhere outside of the pipeline. The wireless transceiver 130 can also receive data, such as firmware updates or other data. Wireless transceiver 130 can operate using a wireless communications protocol that can penetrate the pipeline but not interfere with the operation of the EM transmitters and receivers. For example, wireless transceiver 130 can include a transmitter to transmit the results of analytical analyses to processors residing outside of the pipeline.

Implementations may leverage data obtained from simulation-based solvers that mimic field conditions, which can be combined with field data where needed, to train artificial neural networks (ANNs), to generate models that predict conditions of the pipe wall. Such models can greatly reduce the reliance on direct data acquisition from the field. For example, the AI-analytics can incorporate physics-based solvers which simulate receiver readings based on a given cross-sectional status of the pipe wall. As illustrated in FIG. 1B, and further explained below, the ANN can be trained to provide a model that can predict receiver readings based on a given defect condition. Using the ANN model, the implementations can analyze and compare the received signals from receivers on capsules 104 to infer a status of the wall of the pipe being inspected.

The arrangement of the combination of transmitters 106 and receivers 180 are designed and optimized to operate at an adequate setup with the objective to successfully detect defects that may be present in pipelines. The transmitters 106 and receivers 108 are located at the front and/or the back of a floatable body 102, and are optimized for maximum performance efficiency. The transmitter 106, responsible for emitting the initial electromagnetic signal for inspection, is operated at a frequency that is selected to successfully interact with the material composition of the target pipeline, such as Carbon Steel (API 5L X60). The receivers 108, responsible for collecting the transmitted signal after its interaction with the pipeline, are designed to couple and interact with this received signal with the primary objective for them to be able to decouple and distinguish a defected segment of the pipe from those that are not. In return, the physical sizes and dimensions of the transmitters 106 and receivers 108 are also optimized not only to respond to the presence of a defect or not, but to also distinguish them in terms of their various sizes. The variation in the classes of such defects are readily outlined by several industry standards. For example, API 1163 (In-line Inspection Systems Qualification) and POF (Specifications and requirements for in-line inspection of pipelines). In relation to these guidelines, the smallest surface area size that needs to be detected can be in the order of A×Amm2. In our case, A=12.7 mm, which is defined in relation to the thickness, t, of the target pipeline.

Figure 2:
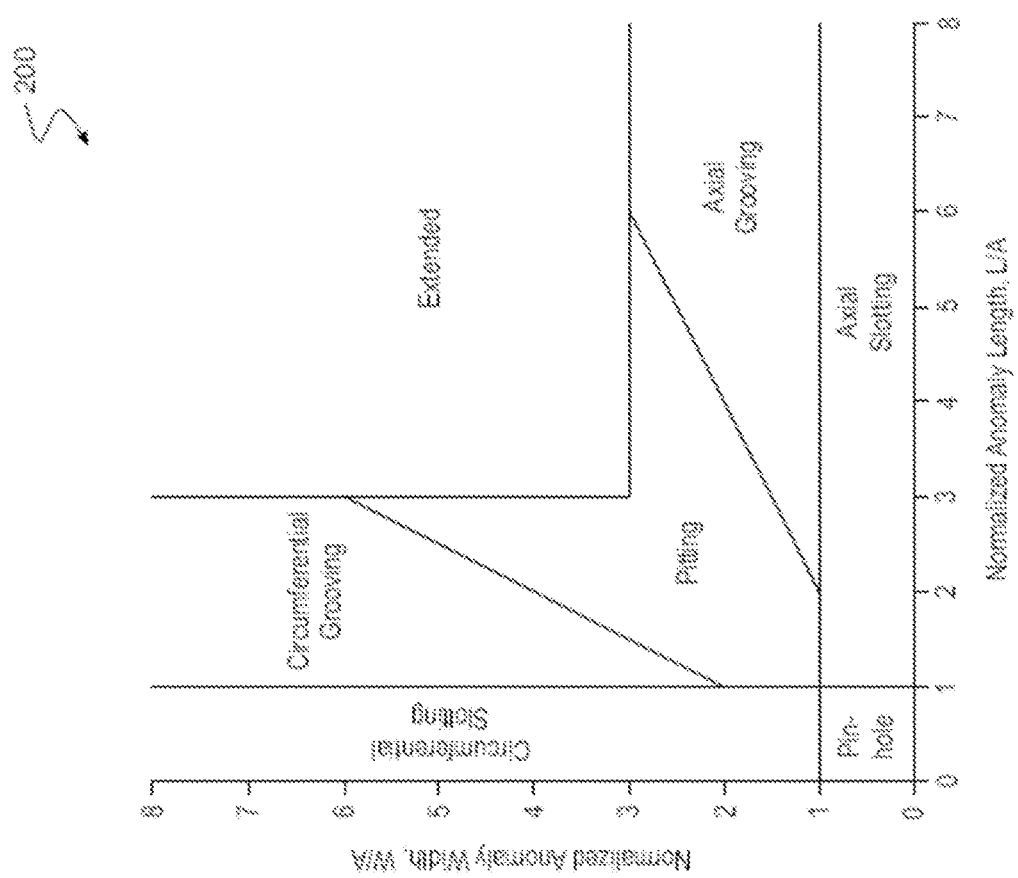
FIG. 2 illustrates an example for characterizing defects according to sizes.

FIG. 2 provides illustrative guidance on deriving dimensions of defects for metallic bodies, such as metallic pipelines. FIG. 2 illustrates an example for characterizing defects according to sizes. In the illustration, the smallest surface area size that needs to be detected can be on the order of A×Amm2. In one example, A=12.7 mm, which is defined in relation to the thickness, t, of the target pipeline. As illustrated, defects with surface area that fall within the range of A×Amm2 are referred to as pinholes. The ability to detect and identify pinholes is of particular challenge, as this reflects the sensitivity of a detection/identification methodology. Various implementations are capable of achieving pinhole detection by a judicious selection and optimization of parameters that include, for example, the operating frequency and the combination of the transmitter-receiver configuration (e.g., specific particulars of the sizes, the arrangement, and the spacing from each other). In this regard, the success of this criterion, amongst others, including the operating frequency and the combination of transmitter-receiver arrangements, as well as specific particulars of their sizes, their arrangement, and spacing from each other; overall, they are collectively tuned and optimized.

It is noted that an advantage of mounting this design shown in FIG. 1A of the setup of transmitters and receivers within a floatable body leads to a design that is more compact when compared to other ILI tools. Additionally, it functions and operates at a different physical and mechanical principles than existing solutions. For example, one widely adopted mechanism is Magnetic Flux Leakage (MFL). MFL relies on employing large magnets in order to create a saturated magnetic field on the walls of the steel pipes, leading to very heavy and large devices in the order of 500 Kg and more than 5-6 meters long. The presence of defects is expected to lead to leaked flux that can then be sensed by a sensor or a coil placed near the wall of the pipe. Nevertheless, while widely used, in practice it achieves limited rate of success in the challenging to identify defects, such as pinholes. Furthermore, according to reports obtained from the field, they also tend to suffer from high false positive (FP-defects that do not exist) and false negative (FN-unidentified defects). The FPs translate into redundant excavation and verification with the inevitable high costs. Whereas, the impact of FN is even more severe since it can lead to high likelihood of pipelines failures and therefore product leak, which can significantly impact the reliability of operations.

Returning to FIGS. 1A-1B, the floatable body 102 can be formed from a floatable or buoyant material. The material can be selected based on the density of the production fluid in which the smart body 100 is to operate. Specifically, the material of the smart body floatable body 102 can be selected to be neutrally buoyant within the production fluid so as to be carried by the production fluid as the production fluid traverses the pipeline. In embodiments, a special production fluid can be used specifically for testing the pipes to ease the design of the smart body 100.

In FIG. 1B, the smart body 100 is shown to include AI processing in addition to the EM transmitters and EM receivers. EM transmitters and EM receivers operate to transmit an EM signal to the pipeline body and receive EM signals from the pipeline body. The defect detection mechanism relies on an underlying EM field interactions with the pipe and specific and unique responses recorded at the receivers. These unique signatures are then used for training the AI algorithm so that when it sees a signal again it will automatically classify them accordingly.

In one embodiment, the main objective is to achieve solution modularity and scalability of the AI-EM sensing module, both in terms of software (SW) and hardware (HW) capability. Specifically, to enable for the ease of adaptation of the proposed system to consider a multitude of geometrical and material constructions in one unified framework of design. Moreover, to ensure the systems' design and capabilities for the detection of defects sensitive not only against clean cuts, for example squares and circles, but also for those that manifest spatial variations in both depth and breadth of damages.

In another embodiment, this scalable and modular AI-EM sensing module, is engineered embedded into a floating body to form a self-sustained and autonomous design. The capabilities and functionalities of smart body are engineered for high accuracy detection on the likelihood of anomalies in pipelines. The choice of body shape is agnostic; therefore, it provides liberty for its choice and can be determined from the specifications needed in the targeted O & G fields. This will further ensure: ease of technology deployment, cost-effectiveness, and solution-scalability.

In another embodiment, the body containing the sensing device is made of floating material and will sustain the maneuvering of its movements as a result of the buoyancy and flow of the gas or fluid travelling through the inspected pipes. Since the flow of the fluids will be used to give momentum to the free traveling body, it could also be converted to kinetic energy to increase the device's battery life.

In a further embodiment, scalable and modular AI-EM sensing module is designed to satisfy operational requirements, with the objective in achieving the following. I) Reliable detection rate. II) Showcase its AI capabilities to characterize the health of inspected assets in near real-time response. III) A data platform, whereby data collected from the field can also be utilized to feed into the AI learning where needed. IV) A data analytics with predictive functionality on the long-term health of pipelines and their integrity.

The overall features of smart body 100 include, but are not limited to: online inspection, contact-less sensing, un-tethered, high detection rate, near real-time reporting, data analytics platform. The smart body 100 can facilitate the following benefits:

The elimination or mitigation on the reliance on field data or direct data acquisition from the field via using data produced from physics-based simulators that mimic field conditions;

Modularity and scalability of the AI-EM sensing module and detection capability;

Defect detection in multiple or various different scenarios;

The possibility and ability to characterize structures of different and/or material makeup (for example metallic and/or non-metallic);

The reliable detection rate on the likelihood of defects comparted to current practices;

Lower operating costs comparted to current practices;

Contact-less sensing, the AI-EM sensing device does not rely on a contact with body of assets to determine their healthiness and status;

Un-tethered, embedded in a floating body allowing for the device to be used for inspection;

Deployable smart bodies to inspect pipelines while the asset is online, minimizing shutdown times;

Traceable via robotic-crawling systems equipped with wire-less communication to both monitor the device status and perform data collection of the recorded signals of the inspection process;

Disintegrable within the pipeline in the scenario that it become irretrievable

Real-time reporting via AI and local or remote (edge/fog) computing; and

Data processing and analytics platform for the characterization of long-term health of inspected assets and their integrity.

Figure 3:
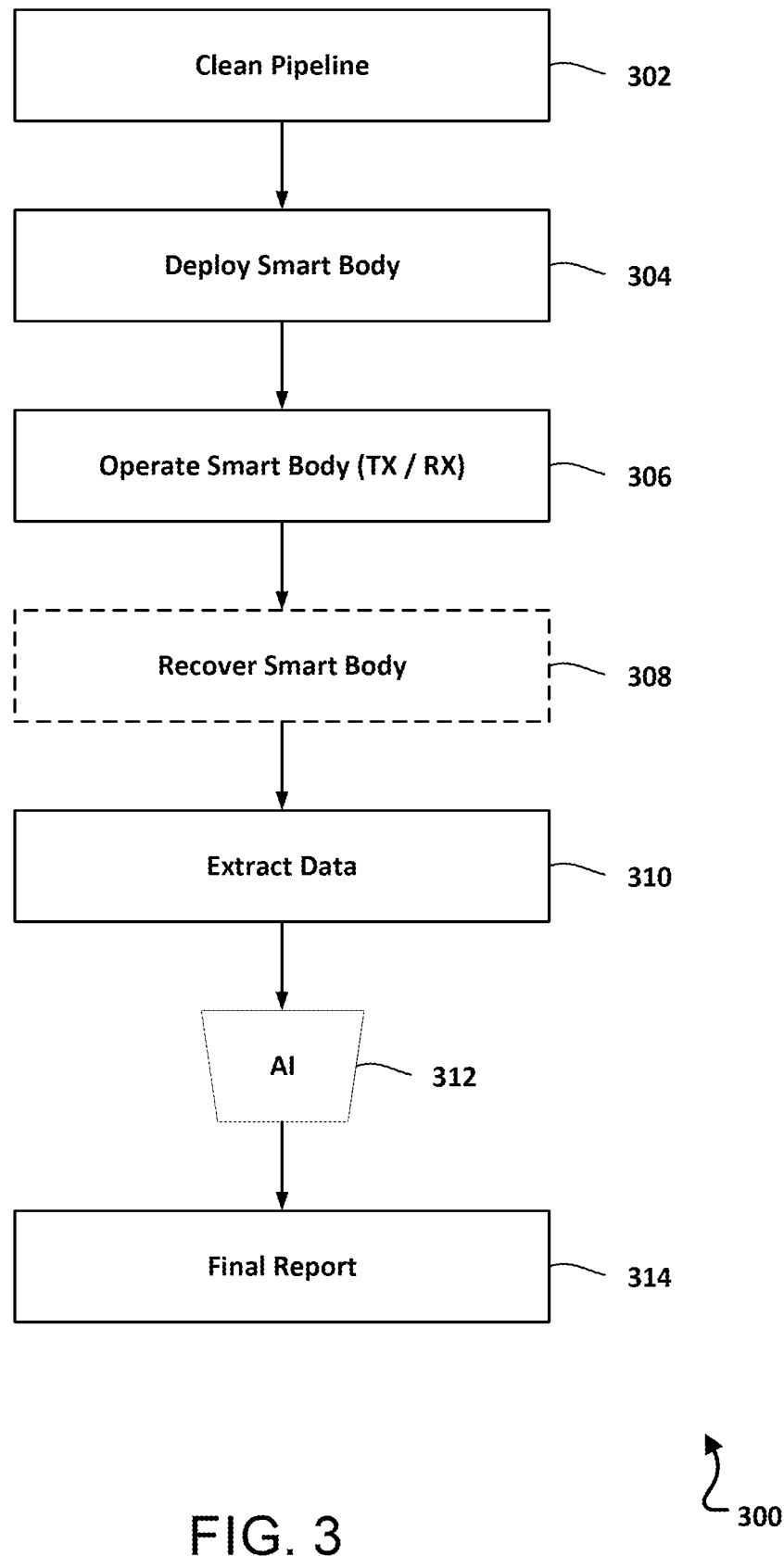
FIG. 3 is a process flow diagram that provides an overview for the smart body artificial intelligence-electromagnetics (AI-EM) based analysis in accordance with embodiments of the present disclosure.

FIG. 3 is a process flow diagram that provides an overview for the smart body AI-EM based analysis in accordance with embodiments of the present disclosure. Pipelines may undergo a cleaning operation, on a rate of, for example, a monthly basis, to remove and reduce the accumulation of contaminating foreign bodies and debris within and/or on the inner surfaces of pipelines.

For clarity of presentation, the description that follows generally describes process flow 300 in the context of the other figures in this description. However, it will be understood that process flow 300 can be performed, for example, by any suitable system, environment, software, and hardware, or a combination of systems, environments, software, and hardware, as appropriate. In some implementations, various steps of process flow 300 can be run in parallel, in combination, in loops, or in any order.

At 302, a pipe can be optionally cleaned prior to inspection. In some embodiments, this step does not need to be performed because the pipe can be inspected during normal operation by introducing one or more smart bodies into the pipe with the production fluid. In embodiments for use in clean pipe, the production fluid can still be used to carry the smart bodies; or an engineered fluid designed for the smart body can be used.

At 304, the smart body (or smart bodies) are deployed in the pipeline. In the field, the pipeline typically has a launcher and retriever/receiver for inspection tools. If absent, an entry via a valve may also become possible. The smart body can be deployed during normal operation of the pipe or after it has been cleaned. In the field, these systems typically have launchers and receivers for such inspection tools. If absent, an entry via a valve may also become possible.

At 306, during operation of the smart body, the EM transmitter(s) transmit EM signals. For example, the EM transmitter transmits an alternating electromagnetic signal. The EM receiver coils within the smart body receive EM signals from the body of the pipe. The EM signals induce a signal across the EM receiver coils. The value of the induced signal is determined for each EM receiver in the smart body over a continuous sampling window. That is, as the smart body traverses the pipeline, the value of the induced signal on the EM receiver coils is continuously being determined as part of the surfacing imaging process.

At step 310, the data from the smart body can be extracted. This extraction can be performed after retrieval of the smart body (e.g., at step 308). In embodiments, the data can be extracted in real-time using above-ground-based tracking modules, shown in FIG. 6. In embodiments, AI analysis can be performed in the smart body, and the resulting analysis can be extracted from the retrieved smart body or in real-time by above-ground-based tracking modules.

The induced signal values for each EM receiver for each sensor arrangement in the smart body is input into the artificial neural network. At 416, the induced signal values are processed by the neural network to create a continuous image of the pipe body in two dimensions and along the length of the pipe as the smart body traverse the pipe. At 418, the visual representation is used to determine a likelihood of the presence of a defect in the body of the pipe. For example, the visual representation can indicate a hole or wall loss based on thickness of the body, the presence of absence of image data for certain portions of the pipe, etc.

At 312, an AI-enabled analytic engine can be triggered to process the extracted data. The AI-enabled analytic engine can be in an above-ground processor or can be part of the smart body processing. At step 314, a final report may subsequently be generated in near real-time (e.g., within hours). As illustrated, the improvement can result in at least a 50% reduction in pipeline maintenance costs, associated time, and all required resources.

Figure 4A:
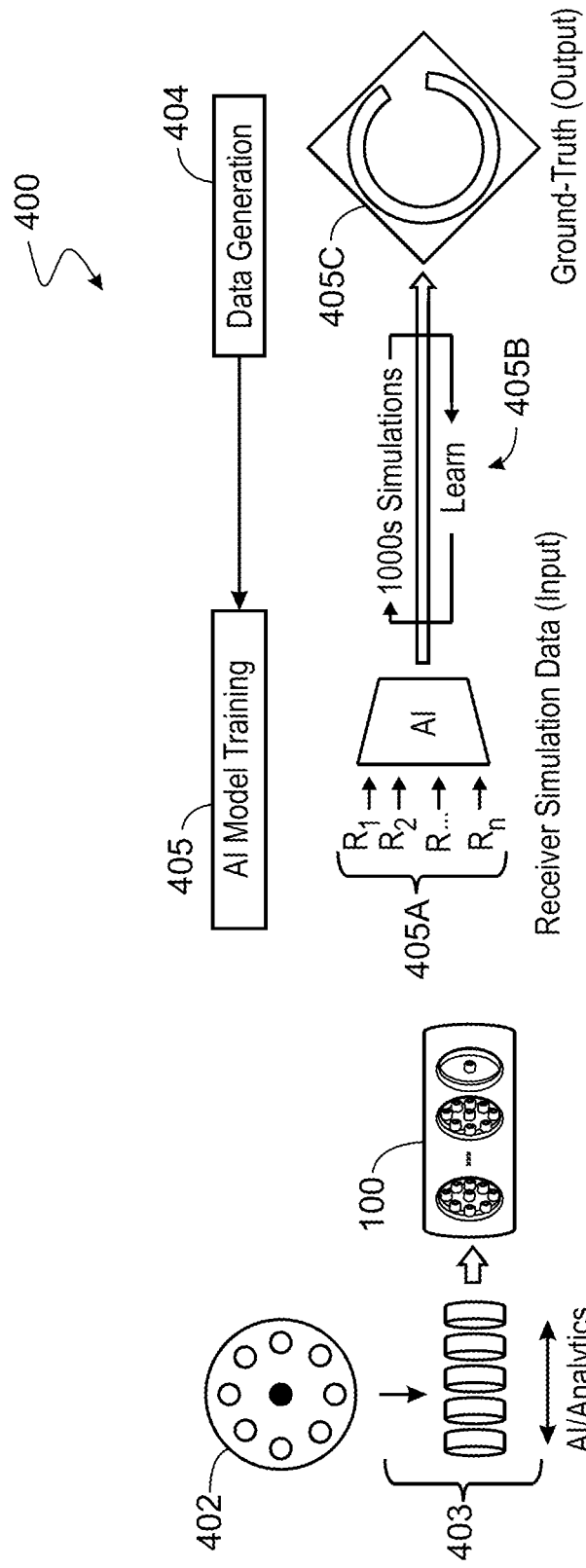
FIGS. 4A-4B illustrate examples of building the inference model and applying the inference model according to an implementation of the present disclosure.
Figure 4B:
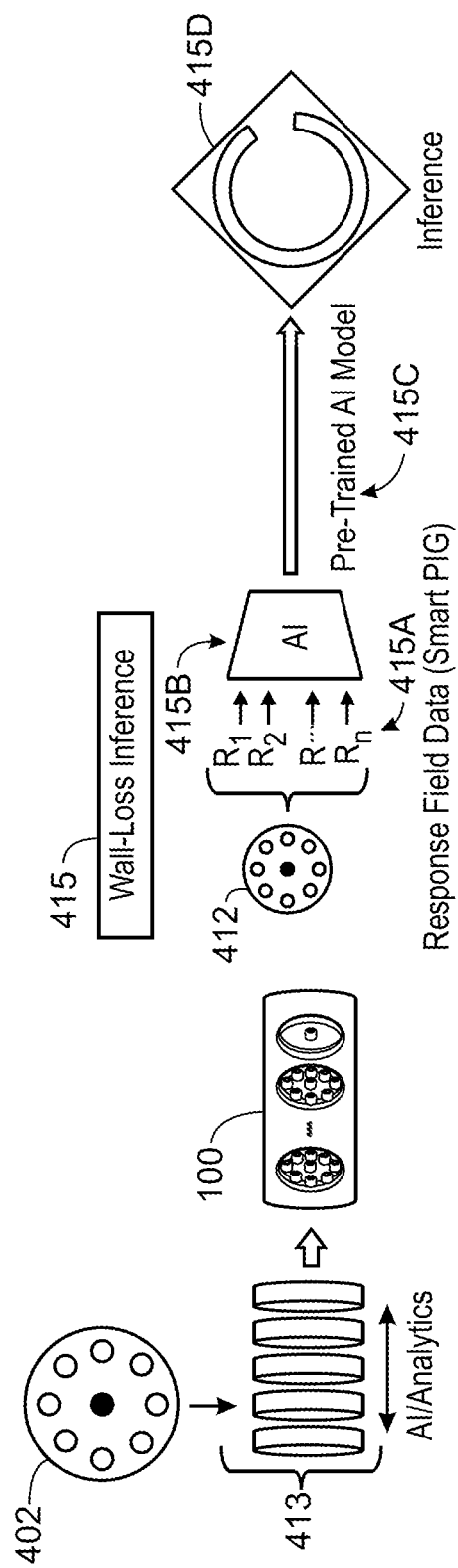

As discussed above in association with FIGS. 1A-1B, the implementations incorporate simulation-based solvers (driven by EM physics) that mimic field conditions. Further referring to FIGS. 4A-4B, using these solvers, sensor data (received on receivers) can be obtained from simulations where the defect of the wall is known beforehand. Diagram 400 illustrates an example in which an AI model is being trained. The training process may apply a configuration of capsule 402 that includes transmitters and receivers arranged in predetermined positions. For example, the transmitter may be located at the center while multiple receivers may be positioned along the circumference, but without contacting the inner wall of the pipelines being inspected. Based on the arrangement of transmitter and receivers, AI analytics (403) may be launched to train a model using simulated data. Data generation 404 may simulate sensor data that would be collected on the receivers in response to EM waveforms emitted by the transmitter in the context of various defect patterns. For example, the simulation may sensor responses when sensors are positioned in known arrangements to receive responses from defect patterns that are prescribed for the simulation. A defect pattern, along with other parameters (such as conductivity and permeability of the wall material, boundary condition of the surrounding soil), can give rise to simulated sensor data that would be obtained from the receivers. The AI model training process 405 can start with seed values for received sensor data (e.g., 405A illustrating $R_1$ to $R_n$). The sensor data may be subject to an AI-powered learning process 405B to build and train the AI model that identifies the specific instance of sensor data that correspond to defect pattern 405C, which has been prescribed as an object of the model. In other words, the learning process may train an AI model that identifies, when given a corrosion or wall-loss pattern on the wall of the pipeline, the boundary condition of the pipeline, and the particular waveform driving the transmitter, the corresponding signal signals on the receivers (e.g., $R_1$ to $R_n$). The learning process may incorporate, for example, a simulation-based solver. Hence, by varying wall-loss patterns that mimics field conditions of all types of wall defects, the corresponding signal signals on the receivers can be simulated, and hence artificial neural networks (ANNs) can be trained. Various implementations may also combine with field data to, for example, calibrate the solver's output, or validate the prediction of the ANNs.

Diagram 410 illustrates an example for applying the trained AI model to provide inspection and inference. As illustrated, capsule 412 is similarly arranged with a transmitter and multiple receivers, like capsule 402 in FIG. 4A. Based on an instance of physically received sensor data on the receivers, the process can apply the trained AI model to predict the corresponding corrosion pattern (413). As outlined in FIG. 4A, the AI model is trained based on a pipeline model with a corrosion pattern to derive the sensor data that would correspond to such corrosion pattern. Using the instance of received sensor data (413) from capsule 412, the inspection and inference process may apply an AI-powered analysis (415B) that is based on the AI model (415C) that has been trained under diagram 400. The result is an inference of the corrosion pattern (415D) that would correspond to the instance of received sensor data.

Because the inference is made online based on an AI model generated using simulated data, the implementations can thus significantly reduce the reliance on direct data collection from the field. Not only can these implementations dramatically speed up the model development process, but also allow for the modularity and scalability in considering various scenarios with equal validity and without relying on the availability of field data to represent such varied circumstances. Here, modularity refers to the ability for components (such as each solver) to be swappable/exchangeable. Scalability refers to the use of additional receivers or array of receivers. Moreover, the implementations can reduce data bias significantly. As discussed above, the simulated sensor data is generated based on mechanistic models designed to mimic the field conditions of a buried pipeline, and obtained from well-established solvers that predicts sensor readings for a plethora of different several scenarios of defects. The mechanistic models can account for varying field conditions. Importantly, this integration of the data readings from array sensor responses with specifically tailored AI-driven algorithms allows for the accurate correlation with (and hence prediction of) defect percentages across various experimental setups when the experimental field conditions have been covered by simulations during model training. Using this integrated system where the custom-made AI-driven algorithms are directly applied to process data from the sensors, and without relying on a specialized know-how for a particular type of smart body device, can lead to both an improved detection rate and a reduced time to report. For example, the reporting can be performed in near real-time, i.e. within hours as opposed to up to 90 days as currently is the case.

In one example, the implementations can achieve solution modularity and scalability of the AI-EM sensing module, both in terms of software (SW) and hardware (HW) capability. Specifically, the implementations can allow for easy adaptation to a multitude of geometrical and material constructions of the underlying pipeline being investigated. Moreover, the implementations can achieve the detection of defects that include not only clean cuts (for example, squares and circles) but also for those that naturally and organically occur and manifest spatial variations in both depth and breadth of damages. For example, the ANN models are trained to factor in defect variations in both depth and breadth of the cross-section of the inner, outer, or full wall-loss.

In another example, this scalable and modular AI-EM sensing module is engineered to be attachable within a smart body device so that the integrated system can form a self-sustained and autonomous design and product. Indeed, the smart body can function like a floatable autonomous device to traverse buried pipelines. The capabilities and functionalities of smart body are engineered for high accuracy detection rates on the likelihood of anomalies in pipelines. The smart body device can be selected based on the specifications and practices used in the targeted oil and gas fields. Such selection can further promote: ease of technology deployment, cost-effectiveness, and solution-scalability.

In yet another example, scalable and modular AI-EM sensing module can be designed to meet operational requirements for pipeline cleaning and inspection, with enhanced performance in both detection accuracy and costs. The module leverages the AI capabilities to characterize the health of inspected assets in near real-time response. The module also provides a data platform, whereby data collected from the field can also be utilized to feed into the AI learning where needed. The module can further incorporate data analytics with predictive functionality on the long-term health of pipelines and their integrity.

Figure 5A:
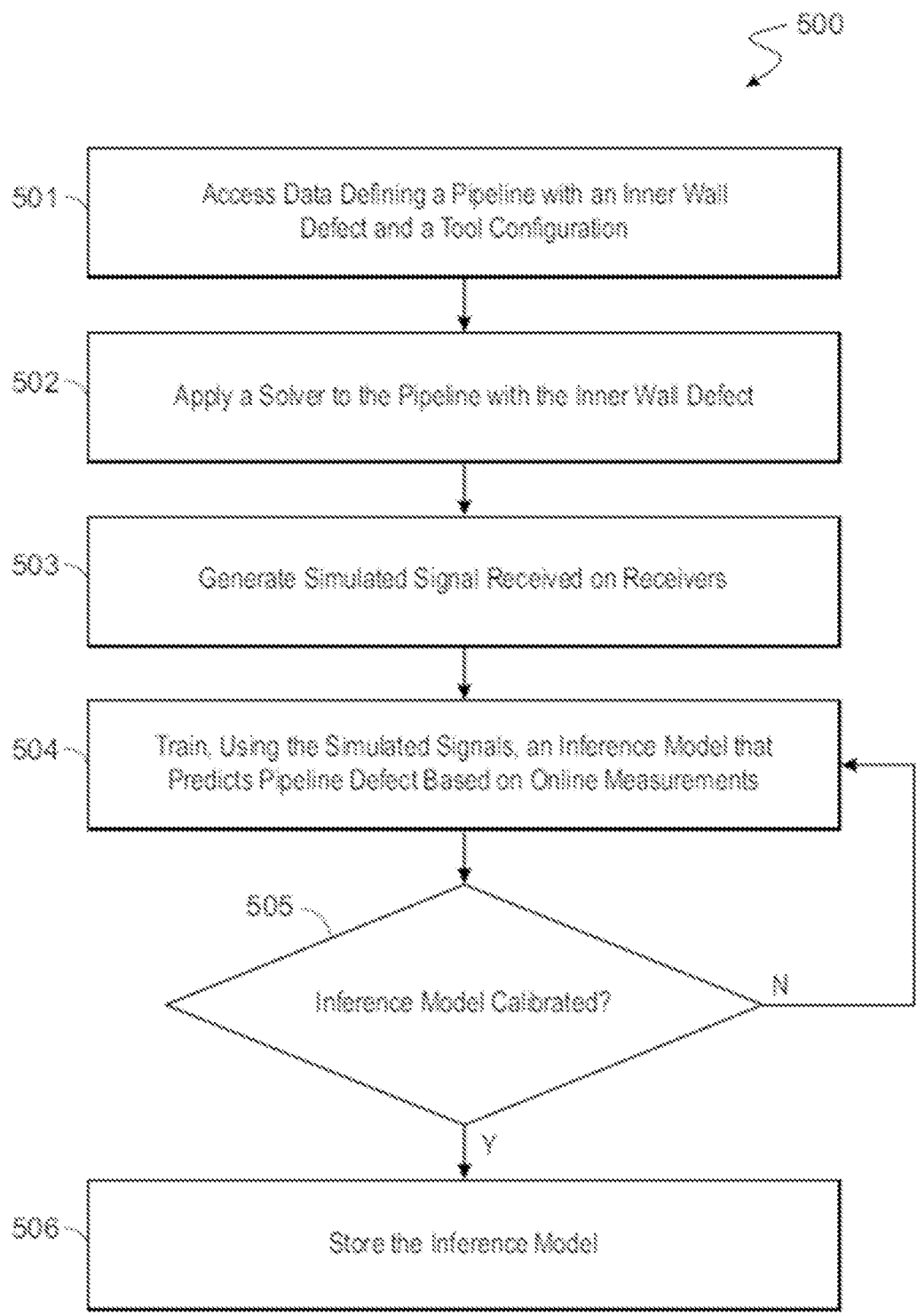
FIGS. 5A and 5B are flowcharts illustrating examples of processes according to an implementation of the present disclosure.

FIG. 5A is a flow chart 500 illustrating an example of a process according to some implementations. The process may start with accessing data defining a buried pipeline that includes a wall defect as well as a tool configuration (501). The tool configuration specifies the arrangement of, for example, a transmitter and multiple receivers on a capsule within a floatable smart body device. As described above, the transmitter may be positioned at a central position while the receivers are located on the circumference but without contacting the inner wall of the buried pipeline. The buried pipeline may be composed of a particular metal material (e.g., steel). The buried pipeline, as defined in the data, may include one or more wall defects. The data may further prescribe a boundary condition of the buried pipeline.

The process may then apply a solver to the defined pipeline when a particular EM waveform is transmitted from the transmitter (502). The solver can compute, based on the prescribed wall defect, the responsive signals that would be collected by the receivers (503). Because the solver computes simulated sensor data from multiple receivers, the simulated sensor data is capable of revealing the spatial extent and depth of the wall defect (both circumferentially and radially). Moreover, the solver may also be applied in instances where the transmitter is rotated axially in which a portion or all the circumference is irradiated.

Using the simulated responsive signals, the process may train an inference model capable of predicting pipeline defects (504). The inference model may incorporate an artificial neural network (ANN) with, for example, multiple layers of weighing network. While the inference model may be trained using simulated sensor data responsive to known defect patterns, the inference model can predict the spatial and depth pattern of a wall defect (both circumferentially and radially), when presented with actual measurement data from the receivers.

In some cases, the training can involve a calibration procedure. For example, the inferred defect may be compared with the known defect, and the difference, if any, may be used as feedback to further fine-tune the inference model. In this example, the process may determine whether the inference model has been calibrated (505). If the determination is that the inference model has been calibrated, the process may proceed to storing the inference model (506). If the determination is that the inference model has not been calibrated, for example, when calibration test results are not satisfactory, the process may return to additional training to fine tune the inference model.

Figure 5B:
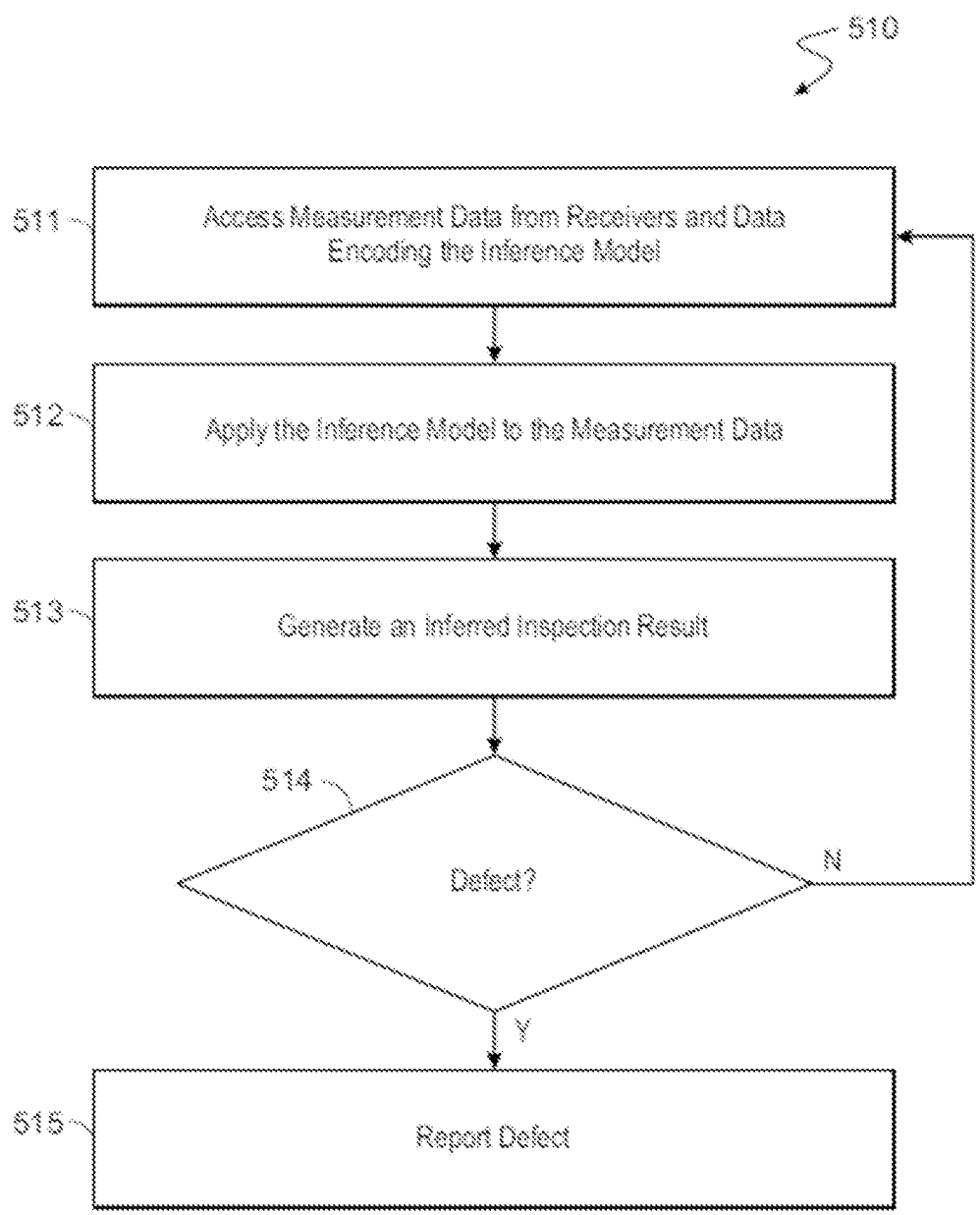

FIG. 5B is another flow chart 510 illustrating an example of a process according to some implementations. The process may release a smart body device into buried pipelines. The smart body device may be equipped with the capsules containing a transmitter and multiple receivers, as well as capsules that include other components, such as a power supply, processor, memory, etc. The smart body is capable of traversing the buried pipelines, and performing inspection using the inference model in an autonomous manner. As illustrated, the process may access measurement data obtained from the receivers and date encoding the inference model (511). The measurement data may be physically received in response to a transmission of a particular EM waveform from the transmitter. The inference model may be built and trained, as illustrated in FIG. 5A. The process may then apply the inference model to the measurement data (512). The process may then generate an inferred inspection result for the buried pipeline at the particular location (513). The inspection result may include a spatial depiction of the cross section of the buried pipeline at the particular location. The inspection result may be analyzed to determine whether the cross section has a wall defect (514). If the defect is identified, the process may report the defect (515). For example, the process may flag the defect to the attention of an operator. If no defect is identified, the process may continue collecting measurement data as the smart body device continues to navigate through the buried pipeline.

Figure 6:
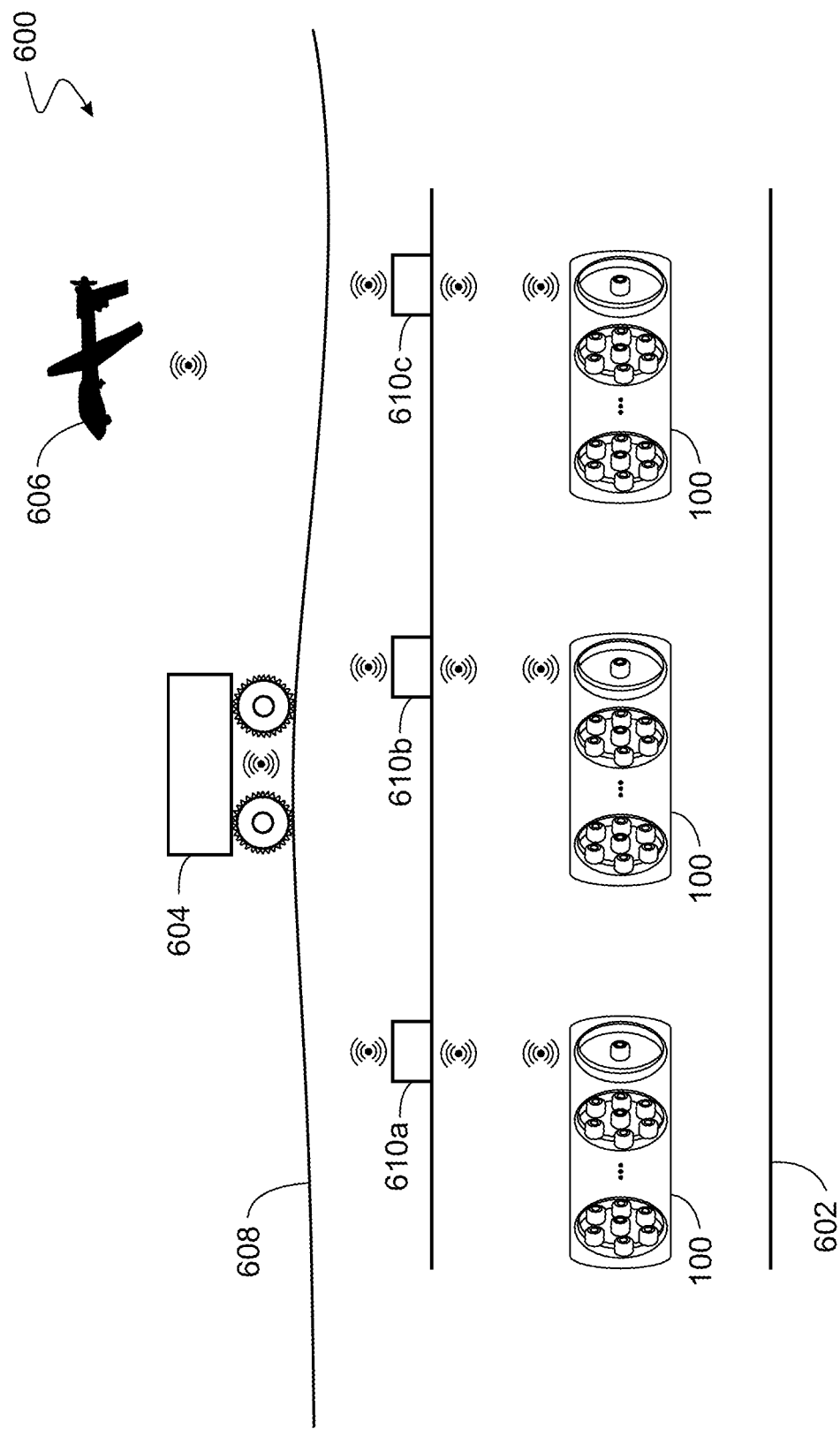
FIG. 6 is a schematic diagram of example smart bodies that can be tracked by a surface device in accordance with embodiments of the present disclosure.

FIG. 6 is a schematic diagram 600 of example smart bodies 100 that can be tracked by a surface device in accordance with embodiments of the present disclosure. In some embodiments, smart body 100 is retrieved to access data stored therein, which can be processes using above ground processors and AI models to determine pipeline characteristics.

In some embodiments, smart body 100 can be tracked using above-ground tracking devices. In order to trace the flow and location of the smart body 100, an unmanned aerial vehicle (UAV) or a drone 606 and/or a robotic crawler 604, both equipped with wireless communications, can be used to monitor the status of the smart body 100. The smart body 100 can communicate with surface device(s) using the wireless transceiver 130 described above. In the illustration of FIG. 6, smart bodies 100 traverse a pipeline 602 in a viscous medium that can be specially designed for this process. The pipeline 602 can be buried, for example, beneath the surface 608; pipeline 602 can also be above ground.

In addition, this external monitoring and tracing system can be utilized for the purpose of continuous data collection of the recorded sensing signals. This online data collection system will serve several aspects of the device's data management, which includes on the fly data retrieval. Therefore, no recorded information is lost if the smart body 100 is lost, irretrievable, or damaged. Top-side communications can also serve to provide industrial internet of things (IIOT) and fog/edge-computing capability for the processing of data; therefore, real-time decision making on the healthiness of assets is realized.

In some embodiments, the pipeline 602 can be fitted with communications stations 610a, 610b, 610c. Communications stations 610a, 610b, 610c can receive communications signaling from smart body 100 as the smart body 100 traverses the pipeline 602. The communications stations 610a can send signaling to other locations or entities, such as home station or to aerial vehicles (drone 606). The communications stations 610a, 610b, 610c can track the movement of the smart body 100 as the smart body 100 traverses the pipeline 602. The communications stations 610a-c (and others across the pipe) can determine whether the smart body 100 is stuck or whether the smart body 100 is progressing through the pipeline 602. In addition, the smart body 100 can offload sensor data or sensor analysis information periodically to the communication stations 610a-c, to reduce the storage and processing and power loads on the smart body 100. Communications stations 610a-c can communicate with other entities to transmit sensor and/or analysis information. Communications stations 610a-c can use a wireless communications protocol for communicating to the smart body 100 and/or to other entities.

The use of persistent communications for the smart body data collection and status monitoring also allows for the smart bodies to be deployed and forgotten. The smart bodies 100 can be traceable using wireless communication techniques (e.g., using a wireless communication subsystem in the smart body). The smart bodies 100 can also be disintegrable by selecting appropriate materials. In the scenario where the device gets stuck, rendering it irretrievable, disintegration of its entire makeup can occur. Such disintegration can occur over time via the breakdown of the materials making up the smart body. The remaining constituent components can then flow freely through the pipeline and out an exit port of the pipeline. There are suitable materials that would allow for the bulk of the body to breakdown with time, or the materials can disintegrate under an added applied pressure from the flowing product, or a self-disintegration mechanical built-in setup can be employed. In all scenarios, all sub-components that lingers for a longer period of time will just swim free within the natural flow of the product and get be flushed out at the outlet. If the smart body is determined to be stuck or unmovable in the pipeline, a disintegration process can be initiated. For example, initiating the disintegration process can include retrieving any stored information on a memory in the body, erasing memory and clearing other secure information, and/or associating any smart body identifiers as lost.

Figure 7:
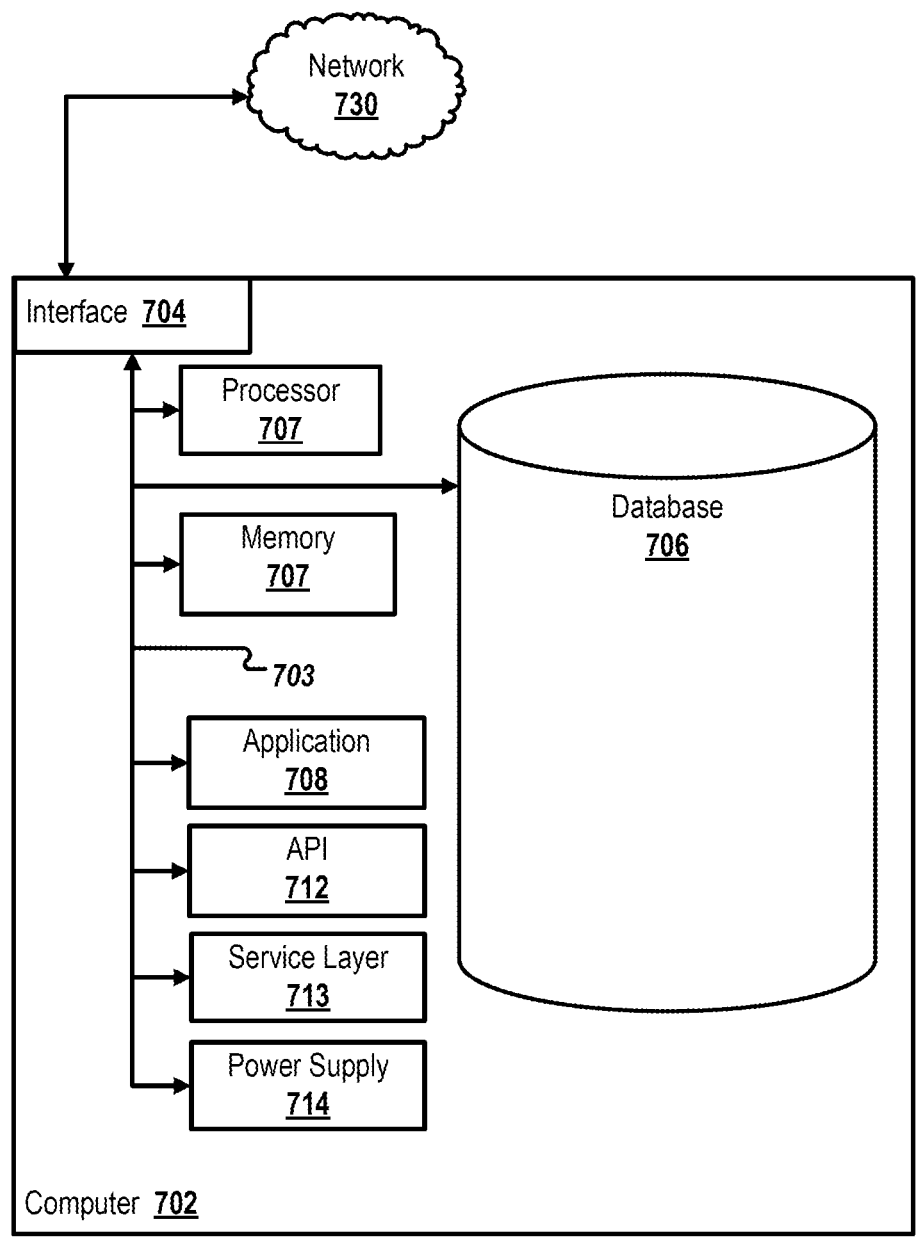
FIG. 7 is a block diagram illustrating an example of a computer system used to provide computational functionalities associated with described algorithms, methods, functions, processes, flows, and procedures, according to an implementation of the present disclosure.

FIG. 7 is a block diagram illustrating an example of a computer system used to provide computational functionalities associated with described algorithms, methods, functions, processes, flows, and procedures, according to an implementation of the present disclosure. The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can comprise a computer that includes an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a computer system as a client, network component, a server, a database or another persistency, another role, or a combination of roles for performing the subject matter described in the present disclosure. The illustrated computer 702 is communicably coupled with a network 703. In some implementations, one or more components of the computer 702 can be configured to operate within an environment, including cloud-computing-based, local, global, another environment, or a combination of environments.

The computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 703 (for example, from a client software application executing on another computer 702) and respond to the received requests by processing the received requests using a software application or a combination of software applications. In addition, requests can also be sent to the computer 702 from internal users, external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is communicatively linked to the network 703 in a distributed environment. Generally, the interface 704 is operable to communicate with the network 703 and comprises logic encoded in software, hardware, or a combination of software and hardware. More specifically, the interface 704 can comprise software supporting one or more communication protocols associated with communications such that the network 703 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 703 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702. As illustrated, the database 706 holds the previously described data 716 including, for example, data encoding the inference model, the solver, the prescribed defect patterns, simulated sensor data, and actual measurement data from the receivers.

The computer 702 also includes a memory 707 that can hold data for the computer 702, another component or components communicatively linked to the network 703 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 703. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. An apparatus comprising:
   a buoyant housing that is buoyant in a production fluid, the buoyant housing comprising a disintegrable material;
   a sensor arrangement housed within the buoyant housing, the sensor arrangement comprising an electromagnetic (EM) transmitter radially surrounded by a plurality of EM receivers, the EM transmitter to transmit an alternating EM radiation signal through the buoyant housing, and the plurality of EM receivers to receive EM radiation through the buoyant housing, the received EM radiation to induce a signal in at least one of the plurality of EM receivers;
   a wireless communications system to communicate a location of the apparatus to an aerial or terrestrial tracking device;
   a hardware processor; and
   a non-transitory computer-readable storage medium coupled to the hardware processor and storing programming instructions for execution by the hardware processor, the programming instructions instructing the hardware processor to perform operations comprising:
   while operating in a pipe, the pipe including a pipe body made of one or a combination of metallic, non-metallic, or composite material:
   determining an induced signal value for each of the plurality of EM receivers;
   receiving a plurality of induced signal values, the plurality of induced signal values including the induced signal value for each of the plurality of EM receivers;
   providing the plurality of induced signal values to a neural network tangibly embodied on the non-transitory computer-readable storage medium;
   generating, using the neural network, a visual representation of the pipe body, based on a comparison of the plurality of induced signal values; and
   determining, using the neural network, whether a body defect exists on an inner surface, an outer-surface, or the pipe body, based on the comparison of the plurality of induced signal values.

2. The apparatus of claim 1, wherein the buoyant housing comprises an electromagnetically transparent material or a material with low magnetic permeability ($\mu<1$).

3. The apparatus of claim 1, further comprising a battery to supply power to the EM transmitter and the hardware processor, wherein the battery comprises a kinetic energy charger.

4. The apparatus of claim 1, wherein the neural network is configured to process induced signal value information to output the visual representation of the pipe body.

5. The apparatus of claim 4, wherein the neural network implements a physics-driven machine learning algorithm to create the visual representation of the pipe body.

6. The apparatus of claim 5, wherein the visual representation of the pipe body produced by the physics-driven machine learning algorithm represents a layout of the pipe body at a point or area along the pipe body.

7. The apparatus of claim 5, wherein the visual representation of the pipe body produced by the physics-driven machine learning algorithm represents a cross section of the pipe body.

8. The apparatus of claim 1, wherein a presence of the body defect on the pipe body is determined by the neural network based on an indication of damages from a first induced signal of at least one receiver, the body defect identified by a comparison of a thickness of the pipe body and/or deformation at different locations of the pipe body.

9. The apparatus of claim 1, wherein each of the plurality of EM receivers comprise a sensor coil or winding that received the EM radiation to induce the signal.

10. The apparatus of claim 1, wherein the sensor arrangement is a first sensor arrangement and wherein the EM transmitter is a first EM transmitter and the plurality of EM receivers are a first plurality of EM receivers, the apparatus further comprising:

a second sensor arrangement residing within the buoyant housing, the second sensor arrangement comprising a second EM transmitter surrounded by a second plurality of EM receivers.

11. The apparatus of claim 1, wherein the buoyant housing comprises a substantially cylindrical form factor and houses a plurality of sensor arrangements, each sensor arrangement comprising the EM transmitter and the plurality of EM receivers.

12. A non-transitory computer-readable storage medium coupled to one or more hardware processors and storing programming instructions for execution by the one or more hardware processors, the programming instructions instructing the one or more hardware processors to perform operations comprising:
  while operating in a pipe with a production fluid, the pipe including a pipe body made of one or a combination of metallic, non-metallic, or composite material:
  determining an induced signal value for each of a plurality of electromagnetic receivers housed within a buoyant housing, wherein the buoyant housing is buoyant in the production fluid and comprises a disintegrable material, and the buoyant housing encloses a sensor arrangement that comprises:
  an EM transmitter radially surrounded by the plurality of EM receivers, the EM transmitter to transmit an alternating EM radiation signal through the buoyant housing, and the plurality of EM receivers to receive EM radiation through the buoyant housing, the received EM radiation to induce a signal in at least one of the plurality of EM receivers;
  receiving a plurality of induced signal values, the plurality of induced signal values including the induced signal value for each of the plurality of EM receivers;
  providing the plurality of induced signal values to a neural network tangibly embodied on the non-transitory computer-readable storage medium;
  generating, using the neural network, a visual representation of the pipe body, based on a comparison of the plurality of induced signal values; and
  determining, using the neural network, whether a body defect exists on an inner surface, an outer-surface, or the pipe body, based on the comparison of the plurality of induced signal values.

13. The non-transitory computer-readable storage medium of claim 12, wherein the neural network is configured to process induced signal value information to output the visual representation of the pipe body.

14. The non-transitory computer-readable storage medium of claim 13, wherein the neural network implements a physics-driven machine learning algorithm to create the visual representation of the pipe body.

15. The non-transitory computer-readable storage medium of claim 14, wherein the visual representation of the pipe body produced by the physics-driven machine learning algorithm represents a layout of the pipe body at a point or area along the pipe body.

16. The non-transitory computer-readable storage medium of claim 14, wherein the visual representation of the pipe body produced by the physics-driven machine learning algorithm represents cross sections of the pipe body to form a three-dimensional of the pipe body.

17. The non-transitory computer-readable storage medium of claim 12, wherein a presence of the body defect on or within the pipe body is determined by the neural network based on an indication of damages from a first induced signal of at least one receiver, the body defect identified by a comparison of body formation at different locations of the pipe body.

18. The non-transitory computer-readable storage medium of claim 12, wherein each of the plurality of EM receivers comprise a sensor coil or winding that received the EM radiation to induce the signal.

* * * * *